US012662354B2

(12) United States Patent
La Croce

(10) Patent No.: US 12,662,354 B2
(45) Date of Patent: Jun. 23, 2026

(54) MONITORING OF A DOOR OF AN ELEVATOR

(71) Applicant: Kone Corporation, Helsinki (FI)

(72) Inventor: Davide La Croce, Helsinki (FI)

(73) Assignee: Kone Corporation, Helsinki (FI)

( * ) Notice: Subject to any disclaimer, the term of this patent is extended or adjusted under 35 U.S.C. 154(b) by 1263 days.

(21) Appl. No.: 17/377,740

(22) Filed: Jul. 16, 2021

(65) Prior Publication Data

US 2022/0055866 A1 Feb. 24, 2022

(30) Foreign Application Priority Data

Aug. 24, 2020 (EP) .................................... 20192345

(51) Int. Cl.
*B66B 13/22* (2006.01)

(52) U.S. Cl.
CPC .................................... *B66B 13/22* (2013.01)

(58) Field of Classification Search
CPC ...................................................... B66B 13/22
See application file for complete search history.

(56) References Cited

U.S. PATENT DOCUMENTS

2021/0087018 A1* 3/2021 Pahlke .................. B66B 1/3446
2022/0119224 A1* 4/2022 Blanchard ............. B66B 5/0025
2023/0072967 A1* 3/2023 Lv ....................... G07C 9/00817
2023/0273291 A1* 8/2023 Ozturk .................... G01S 7/006
342/52

FOREIGN PATENT DOCUMENTS

CN 109264526 A * 1/2019
CN 110540118 A * 12/2019 ........... B66B 5/0031
CN 110894037 A * 3/2020
EP 3348508 A1 7/2018
EP 3670415 A2 6/2020
WO WO-2017013709 A1 * 1/2017 ............... B66B 1/04

OTHER PUBLICATIONS

European Search Report for European Patent Application No. 20192345 dated Jan. 22, 2021.

* cited by examiner

*Primary Examiner* — Uzma Alam
(74) *Attorney, Agent, or Firm* — Harness, Dickey & Pierce, P.L.C.

(57) ABSTRACT

The present invention relates to an apparatus for detecting a state of an elevator door, the apparatus configured to: determine, on a basis of a pressure data, at least one indicator value indicative of a change in the pressure; compare the at least one indicator value to a respective reference value; and set, in accordance with a comparison between the at least one indicator value and the respective reference value, a detection result to express one of the following: (i) the elevator door is open, (ii) the elevator door is closed. Furthermore, the invention relates to a method, a computer program product and an elevator system.

17 Claims, 3 Drawing Sheets

MONITORING OF A DOOR OF AN ELEVATOR

RELATED APPLICATIONS

This application claims priority to European Patent Application No. 20192345.5 filed on Aug. 24, 2020, the entire contents of which are incorporated herein by reference.

TECHNICAL FIELD

The invention concerns in general the technical field of elevators. More particularly, the invention concerns monitoring of an elevator.

BACKGROUND

Elevator cars traveling in a shaft comprise a number of doors to increase safety by not allowing passengers to access the shaft e.g. during a travel. An operation of the elevator car doors is controlled with high accuracy and a status of the door are constantly monitored. For example, the elevator car should not start the travel unless the doors are closed and, hence, the status of the car doors is linked to other entities in the elevator system with an aim of maintaining and improving the safety of using the elevator system.

In prior art solutions the monitoring of the status of the elevator car doors is based on obtaining measurement data from one or more sensors coupled to a door frame or to the elevator door so as to generate measurement data on the position of the door leaf, or door leaves, with respect to the frame. The sensors applied in prior art solutions are based on detections generated in response to an electrical contact or detections generated in response to a photoelectric phenomenon (cf. infra-red sensors).

Drawbacks of the existing solutions are that the sensors may get dirty and their operation may get disturbed. Further, the sensors of the described type are coupled to moving parts of the elevator car doors wherein a mechanical stress experienced by the sensors may break the sensors and, hence, cause challenges to the whole elevator system. Further, in the existing solutions the sensors belong to a safety chain of the elevator system, which does not necessary allow access to the sensor data by external entities.

Hence, there is need to introduce novel approaches for monitoring an operation of the elevator car doors, which at least in part mitigate the drawbacks of the prior art solutions.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An object of the invention is to present an apparatus, a method, a computer program product and an elevator system for detecting a state of an elevator door.

The objects of the invention are reached by an apparatus, a method, a computer program product, and an elevator system as defined by the respective independent claims.

According to a first aspect, an apparatus for detecting a state of an elevator door is provided, the apparatus configured to: determine, on a basis of a pressure data, at least one indicator value indicative of a change in the pressure; compare the at least one indicator value to a respective reference value; and set, in accordance with a comparison between the at least one indicator value and the respective reference value, a detection result to express one of the following: (i) the elevator door is open, (ii) the elevator door is closed.

The apparatus may be configured to determine the at least one indicator value indicative of the change in the pressure by applying a statistical analysis to the pressure data over a predefined time window. For example, the apparatus may be configured to perform the statistical analysis by a determination of a variance over the predefined time window for determining the at least one indicator value indicative of the change in the pressure. Also, the apparatus may be configured to perform the determination of the variance by at least one of: on a first order, on a second order.

The apparatus may further be configured to: generate, in response to the detection result expressing that the elevator door is open, a control signal to at least one entity for calibrating an operation of the entity. For example, the apparatus may be configured to generate the control signal to at least one of the following entities: a positioning system of an elevator car in the elevator shaft; an accelerometer associated to the elevator car.

Moreover, the apparatus may be at least one of: a measurement device coupled to the elevator car; an elevator controller; a server device residing in a communication network.

The apparatus may also be arranged to receive the pressure data from at least one pressure sensor configured to measure the pressure from at least one of: an elevator shaft; in the elevator car. For example, the apparatus may be configured to receive the pressure data representing the pressure in the elevator shaft from at least one pressure sensor arranged in at least one of following manner: on a roof of the elevator car; on a wall of the elevator shaft; air vent arranged to transfer air between the elevator car and the elevator shaft.

According to a second aspect, a method for detecting a state of an elevator door is provided, the method, performed by an apparatus comprises: determining, on a basis of a pressure data, at least one indicator value indicative of a change in the pressure; compare the at least one indicator value to a respective reference value; and set, in accordance with a comparison between the at least one indicator value and the respective reference value, a detection result to express one of the following: (i) the elevator door is open, (ii) the elevator door is closed.

The at least one indicator value indicative of the change in the pressure may be determined by applying a statistical analysis to the pressure data over a predefined time window. For example, the statistical analysis may comprise a determination of a variance over the predefined time window for determining the at least one indicator value indicative of the change in the pressure. Also, the determination of the variance may be performed by at least one of: on a first order, on a second order.

Still further, the method may also comprise: generating, in response to the detection result expressing that the elevator door is open, a control signal to at least one entity for calibrating an operation of the entity. For example, the at least one entity may be at least one of: a positioning system of an elevator car in the elevator shaft; an accelerometer associated to the elevator car.

The method may also further comprise: receiving the pressure data from at least one pressure sensor configured to measure the pressure from at least one of: an elevator shaft; in the elevator car. The pressure data representing the pressure in the elevator shaft may e.g. received from at least one pressure sensor arranged in at least one of following manner: on a roof of the elevator car; on a wall of the elevator shaft; air vent arranged to transfer air between the elevator car and the elevator shaft.

According to a third aspect, a computer program product for detecting a state of an elevator door is provided, which computer program product, when executed by at least one processor, cause an apparatus to perform the method according to the second aspect as defined in the foregoing description.

According to a fourth aspect, an elevator system is provided, the elevator system comprising: at least one elevator car, and an apparatus according to the first aspect as defined in the foregoing description.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

Figure 1:
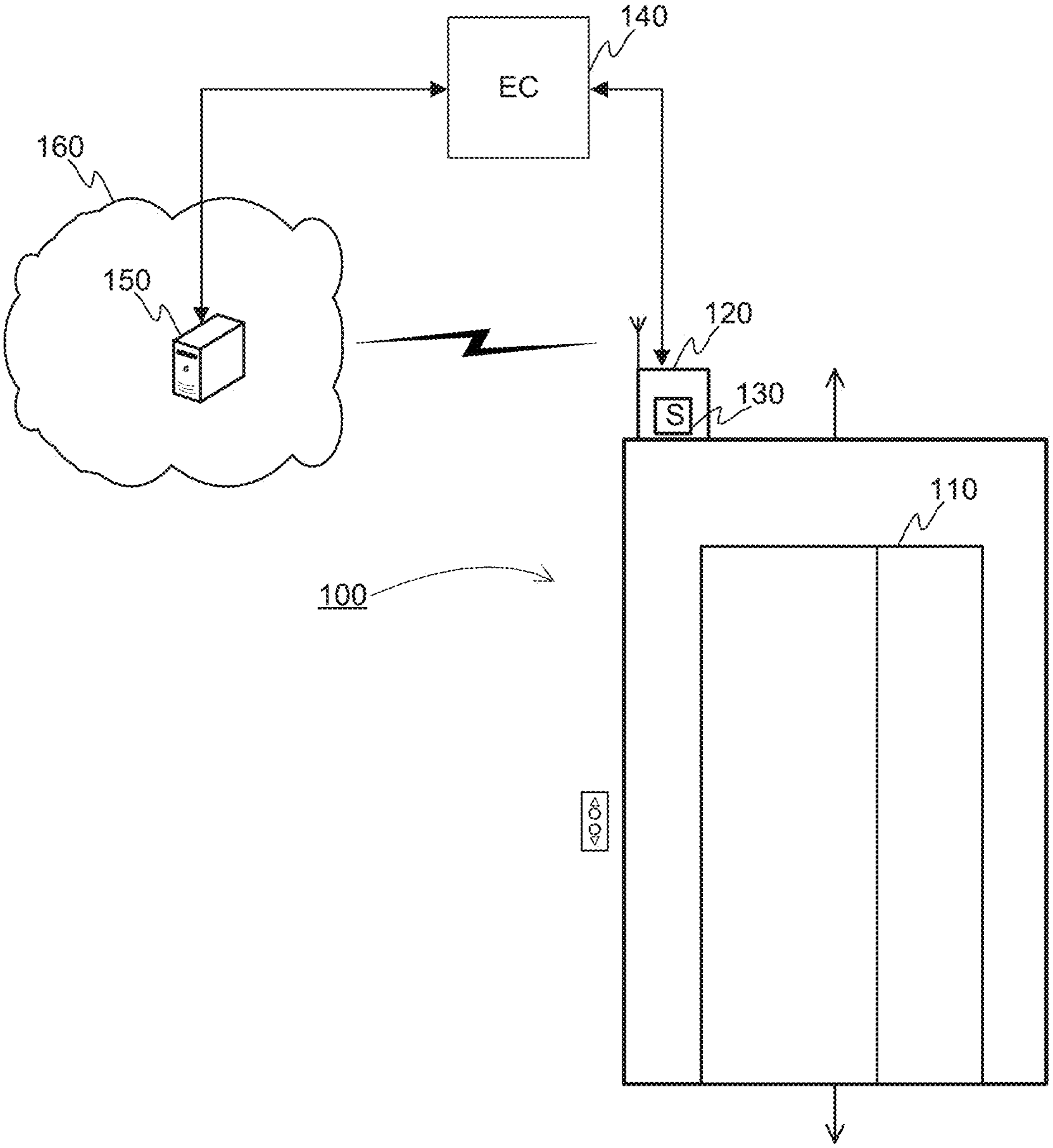
FIG. 1 illustrates schematically an elevator system according to an example.

The specific examples provided in the description given below should not be construed as limiting the scope and/or the applicability of the appended claims.

Lists and groups of examples provided in the description given below are not exhaustive unless otherwise explicitly stated.

Some aspects of the present invention are described in the following by referring to an example schematically illustrated in FIG. 1 wherein it is illustrated some elevator entities as well as other entities of an elevator system. In accordance with the example an elevator car 100 comprising a number of elevator doors 110 is provided. The elevator doors 110 in the context of FIG. 1 shall be understood to cover at least one of the following: an elevator car door, a landing door. In case there are both doors installed, the door system may be implemented so that the elevator doors 110 are controlled to open and close in a synchronous manner e.g. by utilizing so-called door coupler solution for connecting the doors together when operated.

Further, the elevator system comprises a measurement device 120 associated with the elevator car 100, e.g. by coupling the measurement device 120 on a roof of the elevator car 100, so that the measurement device 120 may travel along the elevator car 100 in the travel path, such as in the shaft. The measurement device 120 may comprise at least one sensor 130 being suitable for measure pressure of an environment. An applicable sensor 130 may be a pressure sensor like a barometer. The at least one pressure sensor 130 may be housed in the measurement device 120 or it may be external to the housing of the measurement device 120 but communicatively connected in a wired or in a wireless manner to the measurement device 120. Hence, the measurement device 120 may comprise a communication interface to communicate with the pressure sensor 130, but also with other entities, such as an elevator controller 140 or an entity, such as a server device 150, residing in a cloud computing environment, but serving at least the measurement device 120 in a manner as is described in the forthcoming description. In a selection of the location of the pressure sensor 130 an implementation of the elevator door is advantageously taken into account. The selection may e.g. be done so that it is arranged in a position wherein the pressure may be measured, and possible detections in a change of the pressure may be performed, in accordance with a state of the elevator doors. Applicable locations may e.g. be inside the elevator car 100, or on an external surface of the elevator car 100, such as on a roof of the elevator car 100 as schematically illustrated in FIG. 1. In some examples, the pressure sensor 130 may be arranged in the elevator shaft, e.g. in a vicinity of opening of the elevator shaft to the floors e.g. covered by the landing door, and the respective pressure sensors 130 may be arranged to communication e.g. in a wireless manner with e.g. the measurement device 120 for delivering the data representing the pressure experienced in the location of the pressure sensor 130 in question.

As derivable also from FIG. 1 the communication to the elevator controller 140 and/or the server device 150 residing in a communication network and the measurement device 120 may be performed in a wired manner or in a wireless manner. The wireless implementation to the server device 150 may be implemented at least in part by utilizing a wireless communication resources provided by a mobile communication network providing service in an area in which the elevator system and, hence, the measurement device 120 is arranged to operate. For sake of clarity it is worthwhile to mention that in some examples the measurement device 120 may be arranged to perform its task without communicative connection to the server device 150 or to the elevator controller 140 at least in a direct manner. Further, in some examples the communication of the measurement device 120 to the server device 150 may be arranged to be performed through the elevator controller 140. Still further, in addition to the pressure sensor 130 the measurement device 120 may be configured to receive measurement data from other types of sensors, such as from accelerometers and position sensors, which may at least in part be implemented in the housing of the measurement device 120.

Depending on the implementation a processing of the measurement data obtained from the pressure sensor 130 may be performed by the measurement device 120, or raw measurement data may be transmitted by the measurement device 120 to another entity, such as the elevator controller 140 or the server device 150, for processing. The entity performing the processing of data is now called as an apparatus when describing an example of a method as schematically illustrated in FIG. 2.

Figure 2:
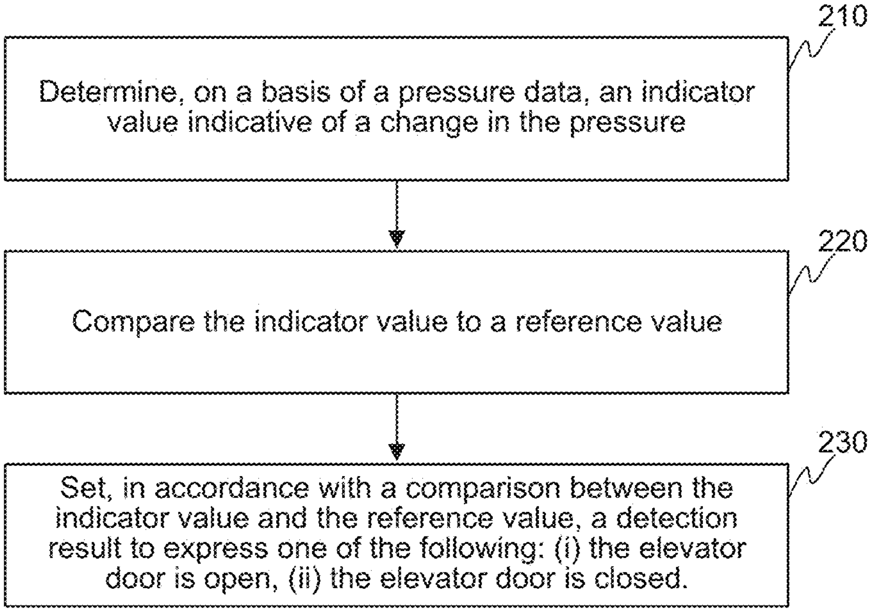
FIG. 2 illustrates schematically a method according to an example.

FIG. 2 illustrates a non-limiting example on a processing of data for determining a state of an elevator door. The elevator door, as already mentioned, herein corresponds to at least one of: the elevator car door, the landing door and wherein an opening of the respective door, or doors, causes airflow at least between the space in question, such as the shaft or the elevator car 100 or even both, and a hall at the landing. In other words, the position of the at least one pressure sensor 130 may be selected in accordance with the implementation of the elevator door so as to allow a detection of the pressure in the measurement position, and variations therein in accordance with the state of the elevator door. For example, if the pressure sensor 130 resides in the shaft side, e.g. on the roof of the elevator car 100 or on the shaft wall, it is necessary that at least the landing door is opened for enabling any detection due to an establishment of a path for air flow between the shaft and the hall. Similarly, if the pressure sensor 130 resides inside the elevator car 100, the elevator doors arranged between the volume of the elevator car 100 and the hall needs to be opened for performing any detections representing the state of the door due to an establishment of a path for air flow between the elevator car 100 and the hall. Still further, the pressure sensor 130 may also be arranged in an air vent arranged to transfer air between the elevator car 100 and the elevator shaft wherein the pressure sensor 130 may receive data representing a state in the pressure at least in the shaft. As derivable from the foregoing description, the at least one pressure sensor 130 is configured to collect pressure data in the elevator environment and the apparatus is arranged to determine 210, on a basis of the pressure data, an indicator value indicative of a change in the pressure in the elevator environment, such as in the elevator shaft. The indicator value may be any applicable mathematical parameter derivable from the measurement data, i.e. from the raw measurement data, containing consecutive pressure values received at a sampling frequency of the measurement system. In an advantageous example, the indicator value may be determined so that it reacts rapidly on the changes in the measurement data. In some example, the change may be determined between two consecutive data values, but such an implementation may not necessary be optimal in a sense of reliability of the solution. Hence, a more sophisticated solution may be based on a determination the indicator value by applying a statistical analysis to the pressure data over a predefined window. The predefined window may be defined over a time which corresponds to a predefined number of data values since the sampling rate may be dependent on the applied system i.e. on at least the pressure sensor 130 capability as well as the communication channel and the processing resources in the apparatus 120.

According to at least some advantageous examples, the statistical analysis may be performed so that an indicator value representing a variance of the data values over the predefined time window is determined. The determination of the variance may be performed by applying a rolling method in the determination of the variance, i.e. a rolling variance, so that the variance is determined for measured pressure data values over consecutive time windows enabling to detect disturbances that are due to environment change comprising at least pressure change during a respective time window. The determination of the rolling variance may be performed for the consecutive time windows e.g. so that at least some of the pressure data values are present in the consecutive time windows. In other words, the time windows are overlapping at least in part. In accordance with some examples, the determination of the variance may advantageously be performed by calculating a variance of a certain order from the pressure data values, such as a first order, a second order or a third order. These orders may be considered in the context of the present solution in such a manner that the first order represents the noise level in the raw data, i.e. in the measurement data values, the second order represents a variability of the noise level (cf. speed) and the variance of the third order represents an acceleration of the noise level. An advantage of using the variance of a selected order in the method in the described manner is that any deviations in the measured pressure data may be detected easier than from the raw data.

In response to a determination 210 of the indicator value the apparatus 120 may be arranged to compare 220 the indicator value to a reference value. The reference value is advantageously defined in advance, e.g. as a fixed value e.g. obtained through trial-error method, and it defines a reference value allowing to perform the comparison so that a conclusion may be made with an acceptable accuracy. For example, the reference value may define a value for the change in a predefined time window so that if the indicator value exceeds the reference value, it may be concluded that the elevator door 110 is open. In some examples, the reference value may be defined dynamically e.g. based on previous measurement results received from the at least one pressure sensor 130. In other words, the reference value is not necessarily fixed but may be defined dynamically e.g. so that it is relative to a regular noise level learned from previous samples derived from the previous time windows. As is clear from the context, the at least one reference value is to be selected and/or defined in accordance with the representation of the indicator value, i.e. in accordance with how the indicator value is calculated.

Finally, in step 230 the apparatus 120 may perform a conclusion, in accordance with the comparison between the indicator value and the reference value, by setting a detection result to express one of the following: (i) the elevator door 110 is open, (ii) the elevator door 110 is closed. The apparatus 120 may be arranged to deliver the detection result to at least one other entity, such as to the elevator controller 140, for further use.

Still further, in some embodiments it is possible to implement the method so that a plurality of indicator values is determined from the raw data, such as variances of a first and a second order. Further, for both of these it is defined respective reference values. As a result, both indicator values are compared to their respective reference values and, the conclusion may be performed based on the comparisons. It is also worthwhile to mention that in case a plurality of indicator values is determined, the respective indicator values need not necessarily be determined from the same set of raw data, but the time window, and, hence, a number of samples may be different for determining the respective indicator values. For example, the conclusion that the elevator door 110 is open may e.g. made if both indicator values exceeds their respective reference values. Naturally, other rules for the decision-making may be defined. This kind of implementation which combines a plurality of comparison paths may be advantageous if an improved accuracy is necessary.

In accordance with the example, in case the apparatus 120 generates an expression that the elevator door 110 is open on the basis of the measurement data obtained from the at least one pressure sensor 130 the apparatus 120, or any other entity received the information on that the elevator door 110 is open, may be configured to generate a control signal to at least one other entity belonging the elevator system. The generation of the control signal may cause a calibration of the at least one other entity wherein the other entity may be one generating information on a state of the elevator system, or the elevator car 100. This is possible because the detection that the elevator door 110 is open confirms that the elevator car 100 resides at a landing and that information may e.g. be used for calibrating a positioning system of an elevator car in the elevator shaft or an accelerometer associated to the elevator car. The positioning system may e.g. be such that it generates position information of the elevator car 100 in the shaft based on detections of magnetic sensors mounted in the shaft at known intervals.

Figures 3A, 3B, 3C:
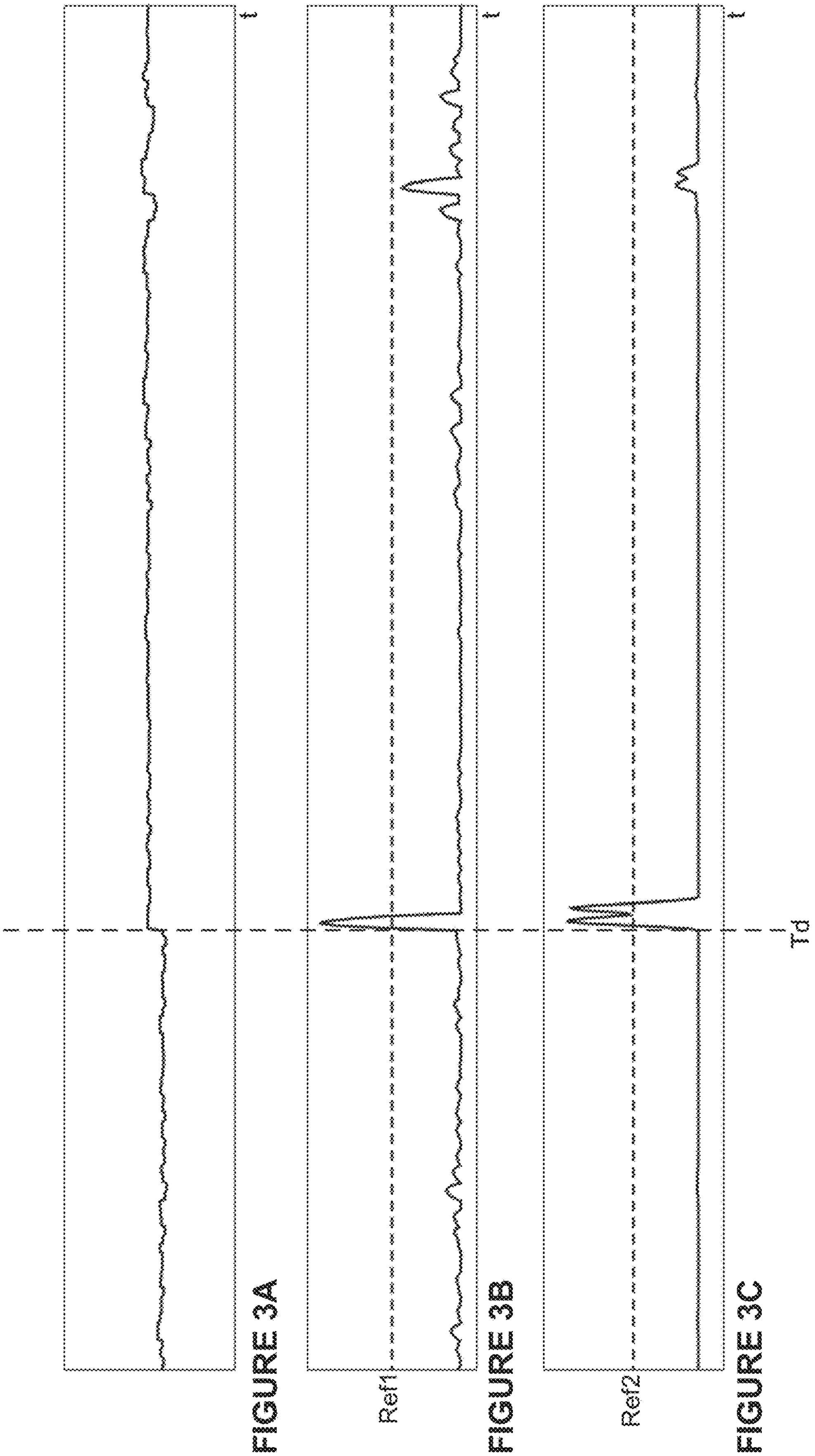
FIGS. 3A-3C illustrate schematically graphs relating to a method according to an example.

FIGS. 3A-3C illustrates schematically, as graphs, examples of determining variances of different orders from pressure data values received from a pressure sensor 130 (FIG. 3A). In other words, FIG. 3A illustrates schematically a magnitude of the pressure data values received from the pressure sensor 130 over the time. By applying the rolling variance on a first order or on a second order generates clear deviations in the graph, and based on at least one of these it may be concluded that the elevator door 110 is opened. FIG. 3B illustrates schematically the variance of the first order and FIG. 3C illustrates schematically the variance of the second order both derived from the measurement data as shown in FIG. 3A. For sake of clarity it is worthwhile to mention that the x axis in the FIGS. 3A-3C represents time and the y axis represents an intensity of the respective signal. However, the intensities of the signals in the FIGS. 3A-3C are not necessarily in the same scale. Still further, as shown in FIGS. 3B and 3C there may be defined respective reference values for the parameter in question. In FIGS. 3B and 3C the reference values are labelled with Ref1 (for the variance of the first order; cf. FIG. 3B) and with Ref2 (for the variance of the second order, FIG. 3C). Further, the instant of time at which the detection may be made is referred with Td, which is drawn common for all the graphs in FIGS. 3A-3C.

Figure 4:
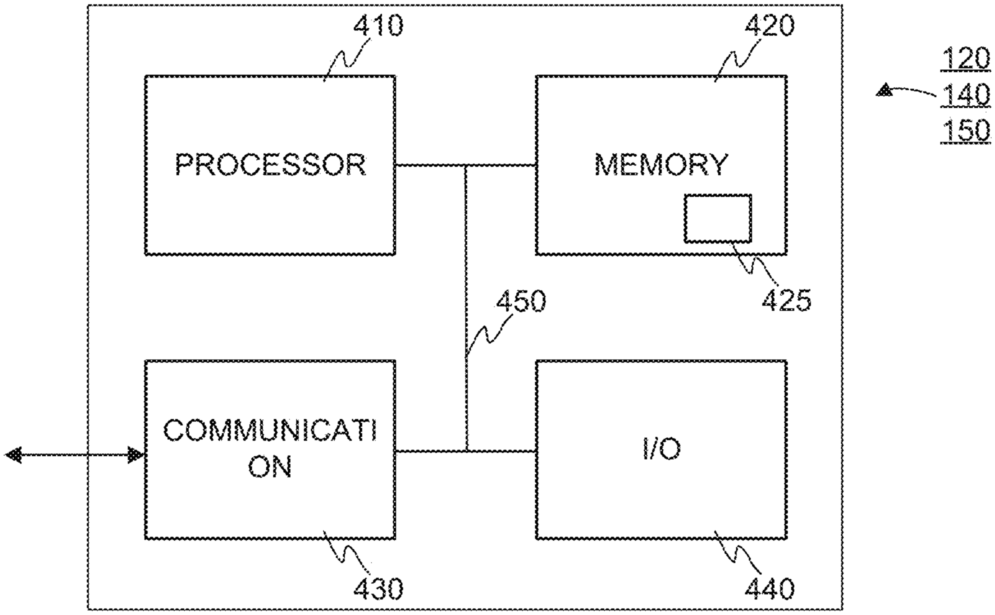
FIG. 4 illustrates schematically an apparatus according to an example.

For example, the apparatus may refer to a computing device, such as a server device, a laptop computer, a PC, or any similar data processing device, as schematically illustrated in FIG. 4. FIG. 4 illustrates schematically as a block diagram a non-limiting example of the apparatus applicable to perform the method in cooperation with other entities, such as with sensors. The apparatus may thus be e.g. the measurement device 120, the elevator controller 140, or the server device 150 as discussed in the foregoing description. For sake of clarity, it is worthwhile to mention that the block diagram of FIG. 4 depicts some components of a device that may be employed to implement an operation of the apparatus. The apparatus comprises a processor 410 and a memory 420. The memory 420 may store data and computer program code 425. The apparatus may further comprise communication means 430 for wired and/or wireless communication with other entities, such as with the at least one pressure sensor 130, and other sensors, but also with other entities. Furthermore, I/O (input/output) components 440 may be arranged, together with the processor 410 and a portion of the computer program code 425, to provide a user interface for receiving input from a user, such as from a technician of the elevator system, and/or providing output to the user of the system when necessary. In particular, the user I/O components may include user input means, such as one or more keys or buttons, a keyboard, a touchscreen, or a touchpad, etc. The user I/O components may include output means, such as a display or a touchscreen. The components of the apparatus may be communicatively coupled to each other via a bus 450 that enables transfer of data and control information between the components.

The memory 420 and a portion of the computer program code 425 stored therein may be further arranged, with the processor 410, to cause the apparatus, i.e. the device, to perform a method as described in the foregoing description. The processor 410 may be configured to read from and write to the memory 420. Although the processor 410 is depicted as a respective single component, it may be implemented as respective one or more separate processing components. Similarly, although the memory 420 is depicted as a respective single component, it may be implemented as respective one or more separate components, some or all of which may be integrated/removable and/or may provide permanent/semi-permanent/dynamic/cached storage.

The computer program code 425 may comprise computer-executable instructions that implement functions that correspond to steps of the method when loaded into the processor 410. As an example, the computer program code 425 may include a computer program consisting of one or more sequences of one or more instructions. The processor 410 is able to load and execute the computer program by reading the one or more sequences of one or more instructions included therein from the memory 420. The one or more sequences of one or more instructions may be configured to, when executed by the processor 410, cause the apparatus to perform the method be described. Hence, the apparatus may comprise at least one processor 410 and at least one memory 420 including the computer program code 425 for one or more programs, the at least one memory 420 and the computer program code 425 configured to, with the at least one processor 410, cause the apparatus to perform the method as described.

The computer program code 425 may be provided e.g. a computer program product comprising at least one computer-readable non-transitory medium having the computer program code 425 stored thereon, which computer program code 425, when executed by the processor 410 causes the apparatus to perform the method. The computer-readable non-transitory medium may comprise a memory device or a record medium such as a CD-ROM, a DVD, a Blu-ray disc, or another article of manufacture that tangibly embodies the computer program. As another example, the computer program may be provided as a signal configured to reliably transfer the computer program.

Still further, the computer program code 425 may comprise a proprietary application, such as computer program code for causing an execution of the method in the manner as described.

Any of the programmed functions mentioned may also be performed in firmware or hardware adapted to or programmed to perform the necessary tasks.

Moreover, as mentioned a functionality of the apparatus may be shared between a plurality of devices as a distributed computing environment. For example, the distributed computing environment may comprise a plurality of devices as schematically illustrated in FIG. 4 arranged to implement the method in cooperation with each other in a predetermined manner. For example, each device may be arranged to perform one or more method steps and in response to a finalization of its dedicated step it may hand a continuation of the process to the next device. The devices may e.g. be the measurement device 120, the elevator controller 140, and the server device 150, or any combination of these as long as the measurement data from the at least one pressure sensor 130 may be conveyed to the respective entities.

Hence, in accordance with some aspects an elevator is provided wherein the elevator system comprises an apparatus to perform the method as described.

In some examples, the detection result obtained with the method may be confirmed with information from other systems. For example, in some embodiments the detection result is confirmed by obtaining measurement data from an accelerometer and by detecting, based on the measurement data from the accelerometer, that the elevator car stands still at the same time when the pressure data indicates that the elevator door 110 is open, it may be concluded that the expression on the state of the elevator door 110 is correct. The position information may be utilized in the same manner to confirm the outcome of the method as described.

In case the apparatus is implemented as a stand-alone device it may be associated with an elevator car 100 as an independent unit to provide information on a status of the elevator system, and especially on a state of the elevator door 110, to an external entities, such as to a server device residing in a communication network. This kind of implementation may be advantageous if the elevator system is old and there are no possibilities to integrate monitoring devices in the elevator system itself, but only introducing those in the elevator system as independent units. In this manner it is possible to generate data for monitoring purposes of the elevator system in question.

The solution as described in the foregoing description may be applied in contexts wherein there is need to understand a state of the elevator door, and use that information for any further use. For example, the information on the state of the elevator door derivable in the described manner may be used for detecting that an elevator car has entered to a floor level, as a non-limiting example.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A system, comprising:

a pressure sensor configured to generate pressure data that indicates an air pressure associated with at least a portion of an elevator system based on measuring the air pressure in at least one of an elevator shaft of the elevator system or a location in an elevator car of the elevator system; and an apparatus configured to detect a state of an elevator door of the elevator system based on the pressure data generated by the pressure sensor, the apparatus comprising:

a memory storing a computer program code; and a processor configured to execute the computer program code to cause the apparatus to determine, based on processing the pressure data, an indicator value that indicates a variation in the air pressure associated with at least the portion of the elevator system over a period of time; and determine whether the elevator door is open or closed based on comparing the indicator value to a respective reference value.

2. The system of claim 1, wherein the processor of the apparatus is configured to execute the computer program code to cause the apparatus to determine the indicator value that indicates the variation in the air pressure associated with at least the portion of the elevator system based on applying a statistical analysis to the pressure data that is generated by the pressure sensor over a predefined time window.

3. The system of claim 2, wherein the applying the statistical analysis includes determining a variance of pressure data values of the pressure data that is generated by the pressure sensor over the predefined time window to determine the indicator value that indicates the variation in the air pressure associated with at least the portion of the elevator system.

4. The system of claim 3, wherein the variance of the pressure data values includes at least one of:

a first order variance of the pressure data values, or a second order variance of the pressure data values.

5. The system of claim 1, the processor of the apparatus is further configured to execute the computer program code to cause the apparatus to:

generate, in response to a determination that the elevator door is open, a control signal to a separate device to cause the separate device to perform a calibration of an operation of the separate device based on the determination that the elevator door is open.

6. The system of claim 5, wherein the separate device is at least one of:

a positioning system of the elevator car of the elevator system in the elevator shaft of the elevator system; or an accelerometer associated with the elevator car.

7. The system of claim 1, wherein the apparatus is at least one of:

a measurement device coupled to the elevator car of the elevator system;

an elevator controller; or a server device located in a communication network.

8. The system of claim 1, wherein the pressure sensor is configured to be located at one of:

a location on a roof of the elevator car;

a location on a wall of the elevator shaft; or a location in an air vent that is configured to transfer air between the elevator car and the elevator shaft.

9. An elevator system, comprising:

at least one elevator car; and the system according to claim 1.

10. A method for detecting a state of an elevator door of an elevator system, the method performed by a system, the system including a pressure sensor and an apparatus, the method comprising:

generating, at the pressure sensor, pressure data that indicates an air pressure associated with at least a portion of the elevator system based on measuring the air pressure in at least one of an elevator shaft of the elevator system or a location in an elevator car of the elevator system; and causing a processor of the apparatus to execute computer program code stored at a memory of the apparatus to cause the apparatus to determine, based on processing the pressure data, an indicator value that indicates a variation in the air pressure associated with at least the portion of the elevator system over a period of time; and determine whether the elevator door is open or closed based on comparing the indicator value to a respective reference value.

11. The method of claim 10, wherein the indicator value that indicates the variation in the air pressure associated with at least the portion of the elevator system is determined based on applying a statistical analysis to the pressure data that is generated by the pressure sensor over a predefined time window.

12. The method of claim 11, wherein the applying the statistical analysis includes determining a variance of pressure data values of the pressure data that is generated by the pressure sensor over the predefined time window to determine the indicator value that indicates the variation in the air pressure associated with at least the portion of the elevator system.

13. The method of claim 12, wherein the variance of the pressure data values includes at least one of:
- a first order variance of the pressure data values, or
- a second order variance of the pressure data values.

14. The method of claim 10, further comprising the processor of the apparatus executing the computer program code stored at the memory of the apparatus to cause the apparatus to:
- generate, in response to a determination that the elevator door is open, a control signal to a separate device to cause the separate device to perform a calibration of an operation of the separate device based on the determination that the elevator door is open.

15. The method of claim 14, wherein the separate device is at least one of:
- a positioning system of the elevator car of the elevator system in the elevator shaft of the elevator system; or
- an accelerometer associated with the elevator car.

16. The method of claim 10, wherein the pressure sensor is located at one of
- a location on a roof of the elevator car;
- a location on a wall of the elevator shaft; or
- a location in an air vent that is configured to transfer air between the elevator car and the elevator shaft.

17. A non-transitory computer readable medium storing a computer program that is executable by a processor of an apparatus to cause the apparatus to:
- determine, based on processing pressure data that is generated by a pressure sensor and that indicates an air pressure associated with at least a portion of an elevator system, an indicator value that indicates a variation in the air pressure associated with at least the portion of the elevator system over a period of time, the pressure data generated based on the pressure sensor measuring the air pressure in at least one of an elevator shaft of the elevator system or a location in an elevator car of the elevator system; and
- determine whether an elevator door of the elevator system is open or closed based on comparing the indicator value to a respective reference value.

* * * * *